[11] 3,610,936

| | | | |
|---|---|---|---|
| [72] | Inventor | David L. Fried | |
| | | Yorba Linda, Calif. | |
| [21] | Appl. No. | 808,913 | |
| [22] | Filed | Mar. 20, 1969 | |
| [45] | Patented | Oct. 5, 1971 | |
| [73] | Assignee | North American Rockwell Corporation | |

[54] APPARATUS FOR DETERMINING THE POSITION OF A DISCRETE TARGET OCCURRING WITHIN A FIELD OF VIEW
8 Claims, 3 Drawing Figs.

[52] U.S. Cl............................................... 250/203, 250/211, 250/233, 250/237, 350/274, 356/147
[51] Int. Cl....................................... G01b 19/56, G01j 1/24
[50] Field of Search.......................... 250/203, 233, 237, 211, 83.3 IR; 350/6, 7, 273, 274, 275; 356/78, 147, 167

[56] References Cited
UNITED STATES PATENTS

| | | | |
|---|---|---|---|
| 2,471,788 | 5/1949 | Snyder et al. | 250/233 X |
| 2,981,842 | 4/1961 | Kaufold et al. | 250/203 X |
| 3,006,233 | 10/1961 | Stiles et al. | 250/233 X |
| 3,098,889 | 7/1963 | Buitkus | 250/211 X |
| 3,107,302 | 10/1963 | Coleman | 250/83.3 X |
| 3,144,555 | 8/1964 | Aroyan et al. | 250/233 X |
| 3,225,450 | 12/1965 | Stanley | 250/211 X |
| 3,426,325 | 2/1969 | Partin et al. | 250/233 X |

*Primary Examiner*—Roy Lake
*Assistant Examiner*—E. R. LaRoche
*Attorneys*—William R. Lane, L. Lee Humphries and Rolf M. Pitts ABSTRACT: In a radiant energy-sensing system, means for determining the position of a discrete target sensed within a field of view of said system and comprising a wedge-shaped reticle having mutually parallel, uniformly spaced, alternate masking and nonmasking strips, all said strips commonly parallel to a radial edge of said reticle, said reticle being rotatably mounted for rotation in the plane thereof and about the apex thereof for modulation of said field of view. There is also provided means responsive to the time-phase occurrence of said modulations for indicating an angular position of said target within said field of view, and means responsive to the number of modulations per reticle cycle for indicating the radial position of said target in said field of view relative to said apex.

INVENTOR.
DAVID L. FRIED

APPARATUS FOR DETERMINING THE POSITION OF A DISCRETE TARGET OCCURRING WITHIN A FIELD OF VIEW

BACKGROUND OF THE INVENTION

Numerous systems have been disclosed in the prior art for detecting and determining the direction of a discrete target or point source of radiant energy such as light, infrared or other forms of energy. Such prior art systems have included the use of circular disclike chopping reticles having a radial array of uniformly spaced radial apertures and positioned at a focal plane or image plane of a radiant energy sensor. Rotation of the reticle about its axis chops or modulates the radiant energy within the sensor's field of view, resulting in a modulated electrical signal output from the sensor. Such output signal is comprised of a time-averaged or DC modulation component corresponding to the time-averaged illumination of the sensor by the modulated field of view and a plurality of lesser time-varying components the spectral content of which corresponds to the chopping frequency of the reticle and harmonics thereof.

A more complete discussion of the effects of target size upon the nonzero frequency components of the modulation spectral energy, the use of spatial filtering techniques to distinguish targets of less than a predetermined size, and the use of nutating radial apertures to effect target tracking is presented in U.S. Pat. No. 3,230,279 issued to G. F. Aroyan, et al., for Optical Search Systems with Controllable Reticle. Other references to the use of rotatable chopping reticles having radial arrays of uniformly spaced apertures or vibrating reticles of linear arrays of mutually parallel uniformly spaced apertures are also provided in the following U.S. Pat. Nos.

3,141,095 to Klose
3,178,992 to Murphy, et al.
3,219,828 to Foster
3,225,459 to 3,413,478 to Gettelfinger, et al.
3,379,891 to Aroyan In all of such arrangements, the sensor or detector assembly is apart and separate from the reticle assembly, both assemblies being required to complete the tracking system. Also, complex nutations and control arrangements are often required to locate the position of a target of interest, as indicated for example in the arrangement of the above-noted U.S. Pat. No. 3,230,379 to G. F. Aroyan, et al. Further, the inclusion of multiple target tracking capability in such prior art techniques is either non feasible or effected only with great difficulty and additional complexity.

SUMMARY OF THE INVENTION

By means of the concept of the subject invention, the above noted shortcomings and disadvantages of the prior art are avoided and a simple reticle assembly is provided for combining the functions of detection and tracking.

In a preferred embodiment of the invention there is provided a radiant energy system, including means for determining the position of a discrete target sensed within the system field of view and comprising a wedge-shaped reticle having mutually parallel, uniformly spaced alternate masking and nonmasking strips, all the strips being commonly parallel to a radial edge of the reticle. The reticle is rotatably mounted for rotation in the plane thereof and about the apex thereof for chopper modulation of the field of view. There is further provided means responsive to the time-phase occurrence of the modulation for indicating an angular position of a detected target occuring within the field of view, and means responsive to the number of modulations per reticle cycle for indicating the radial position of the target within the field of view, relative to the reticle apex, whereby the target position within the field of view is fully identified.

Where the masking strips of the reticle comprise photoconductive strips, commonly connected in electrical circuit, with the modulation-responsive means being responsively coupled in electrical circuit therewith, then the reticle provides a modulated electrical output signal to the modulation responsive means as to combine the functions of modulator and radiant energy sensor. Also, such arrangement is of less bulk, weight and complexity than prior-art combinations of a chopping reticle and cooperating sensor, including associated optics.

Accordingly, it is an object of the subject invention to provide an improved radiant energy target tracker.

It is another object of the subject invention to provide an improved, non-nutating reticle for use in a radiant energy sensor system.

Still a further object is to provide an improved reticle combining the functions of field of view chopper modulation and radiant energy detection.

These and other objects of the invention will become apparent from the following description, taken together with the accompanying drawings, in which:

DESCRIPTION OF THE PREFERRED EMBODIMENT

Figure 1:
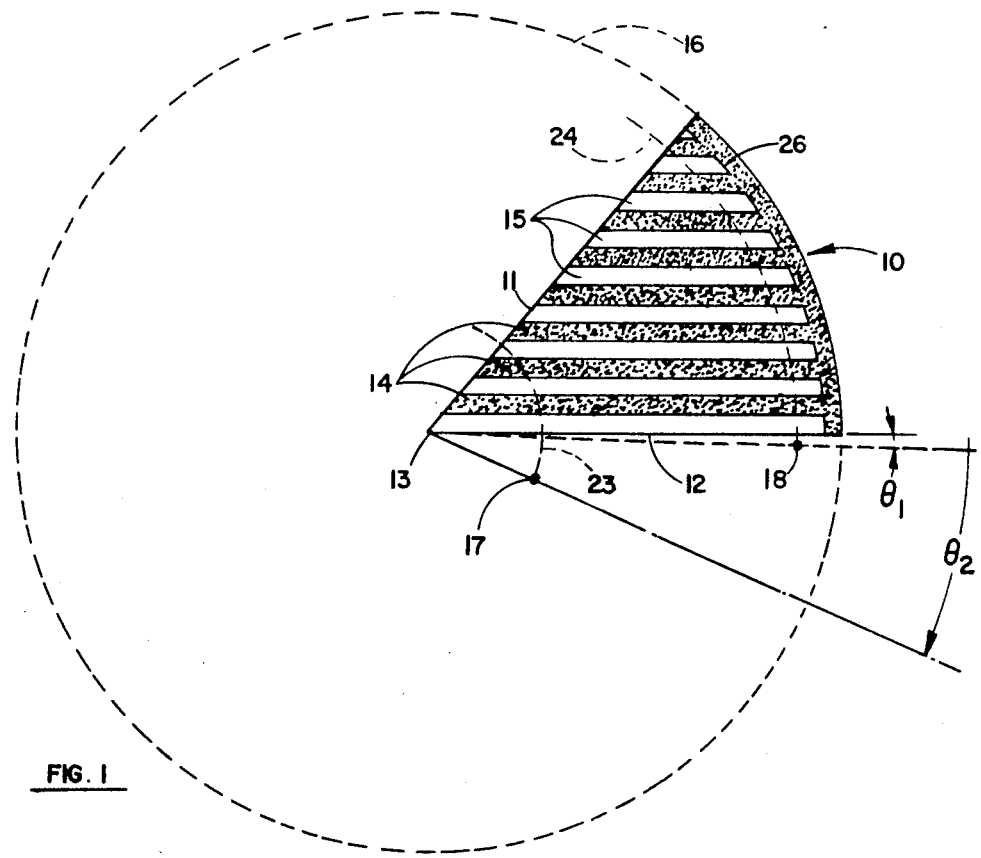
FIG. 1 is a plan view of the reticle of the invention, illustrating the general arrangement thereof.

Referring now to FIG. 1, there is illustrated a wedge-shaped reticle 10 for cooperation in a radiant energy system and having two radial edges 11 and 12, contiguous extremities of which form an apex 13. Reticle 10 also has a plurality of mutually parallel, alternate masking and nonmasking strips 14 and 15, all such strips being commonly parallel to a preselected one of radial edges 11 and 12. The included angle subtended by radial edges 11 and 12 in the plane of the reticle is preferably 45°.

Reticle 10 is adapted to be rotatably mounted for rotation about an axis at apex 13 and perpendicular to the illustrated plane of the reticle. For convenience in effecting a dynamic mechanical balance of the intended rotational system, the reticle may be formed upon a circular disc 16 having a geometric center corresponding to apex 13.

Figure 2:
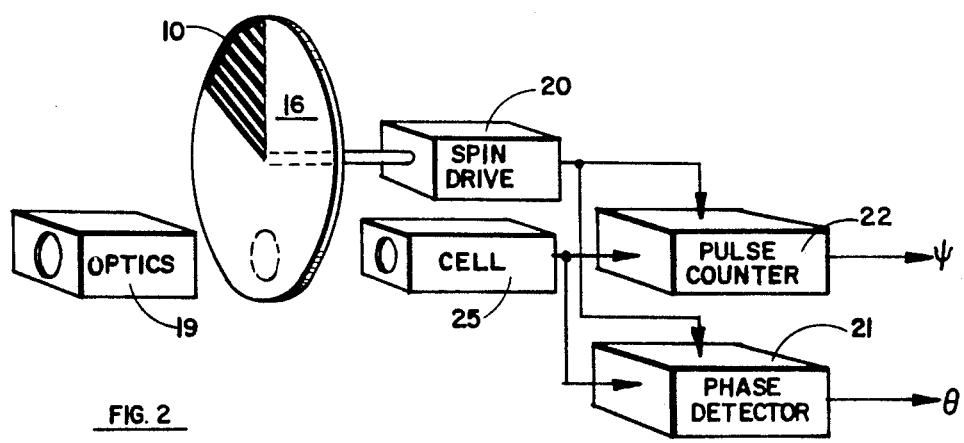
FIG. 2 is an exemplary embodiment of a representative system in which the concept of the invention may be advantageously employed.

In an exemplary embodiment of a representative system in which the reticle of FIG. 1 may be advantageously employed, disc 16 may be of an opaque material and include a reticle 10 having uniformly spaced apertures for a selected set of alternate strips 14. Such a device may then be made to cooperate with a conventional radiant energy sensor, as shown in FIG. 2. In the arrangement of FIG. 2, reticle 10 is rotatably mounted within an image, or focal, plane provided by optics 19 and driven by spin drive means 20 so as to modulate or chop a field of view lying within a 45° sector of the image plane scanned by reticle 10. The modulated image plane is then refocussed upon a radiant energy detector cell 25 which provides a modulated output signal, the spectral content of which corresponding to the modulation imposed on the field of view by the cooperation of aperture disc 16 and spin drive means 20.

There is further provided in the arrangement of FIG. 2, means responsive to the modulations of the field of view for indicating the position in the field of view of a discrete radiant energy target. Such position indicating means includes means 21 responsive to the time-phase occurrence of the non-DC portions of the modulation for indicating an angular position of the target and means 22 responsive to the number of modulations per reticle cycle for indicating the radial position of the target in the field of view relative to apex 13.

The cooperation of the arrangement of FIG. 2 to locate the target field of view position may be better appreciated from a further consideration of FIG. 1.

Referring again to FIG. 1, assume that reticle 10 (as illustrated) is rotating clockwise, and that two stationary, radiant energy-emitting targets are located at points 17 and 18, respectively. It is to be appreciated that a first aperture (of an apertured configuration of reticle 10) will modulate or chop point 18 before it correspondingly chops or modulates point 17, the lesser interval occurring between the illustrated reference position of reticle 10 and the subsequent occurrence of the initial modulation of point 18 being indicative of the position angle $\theta_1$. Similarly, the larger interval intervening until initial modulation of point 17 represents the larger position angle, $\theta_2$.

It is also to be further appreciated from FIG. 1 that the number of modulations of point 17 per cycle or full rotation of reticle 10 (about apex 13) is very few as described by the number of apertures intersected by arc 23, and corresponds to the small radius of such arc; while the number of modulations of point 18 per reticle cycle is greater, as described by the number of apertures intersected by arc 24, and corresponds to the larger radius of such latter arc.

In other words, the time-phase of the modulation is indicative of the target position angle in the field of view and the number of modulations per reticle cycle is indicative of the target radial position in the field of view, relative to apex 13. Because any translational dimension across a given image plane corresponds to a view angle within the field of view corresponding to such image plane, the radial positions of points 17 and 18 relative to apex 13 correspond to respective angular distances $\Psi_1$ and $105_2$ from, or off of, the axis corresponding to apex 13 (transverse to the plane of the drawing). Thus, a two dimensional polar coordinate system is provided, corresponding to a direction angle in a field of view. Such direction angle is defined as the rotation ¼ of a radial line and an angle $\Psi$ off the optical axis, measured in the plane of rotation the rotating radial line.

The data processing elements 21 and 22 are each responsive to the occurrence of a reference drive position of reticle 10, as well as to the occurrence of a modulation output from cell 25. A reference sector, corresponding to the angular extent of reticle 10, may be employed as a clock reference or gating interval to gate-on pulse counter 22 which then records the number of chopper modulations or pulses occurring at the output of cell 25 during each reticle cycle, and corresponding to the radial angle $\Psi$. Such clock reference may also be employed by phase-detector 21 as a time phase reference from which to determine the time phase occurrence of the first pulse of the pulse train output per reticle cycle of cell 25 (and corresponding to $\theta$) by means well understood in the art.

Where the drive speed of drive means 20 in FIG. 2 is substantially constant, then a chain of narrow band-pass filters having successively different center frequencies may be used to determine the angle, $\Psi$. The output of each filter may be threshold detected to avoid false alarms the occurrence of an output signal at a given filter being indicative of a corresponding discrete target angle $\Psi$, within a range of values corresponding to the filter bandwidth. However, the angle resolution obtainable is limited by the bandwidth and number of the filters employed.

The use of a counter 22 responsive to the number of modulations per reticle cycle is particularly advantageous for determining the angle $\Psi$, for the reason that such arrangement is relatively insensitive to variations in the speed of drive means 20 in FIG. 2.

Also, such counter need not display the resolution limit inherent in the use of a plurality of discrete filters. However, the use of such filters in combination with counters may be employed for improved signal-to-noise ratio in each of a plurality of ranges of radial angle $\Psi$, as shown in FIG. 3.

Figure 3:
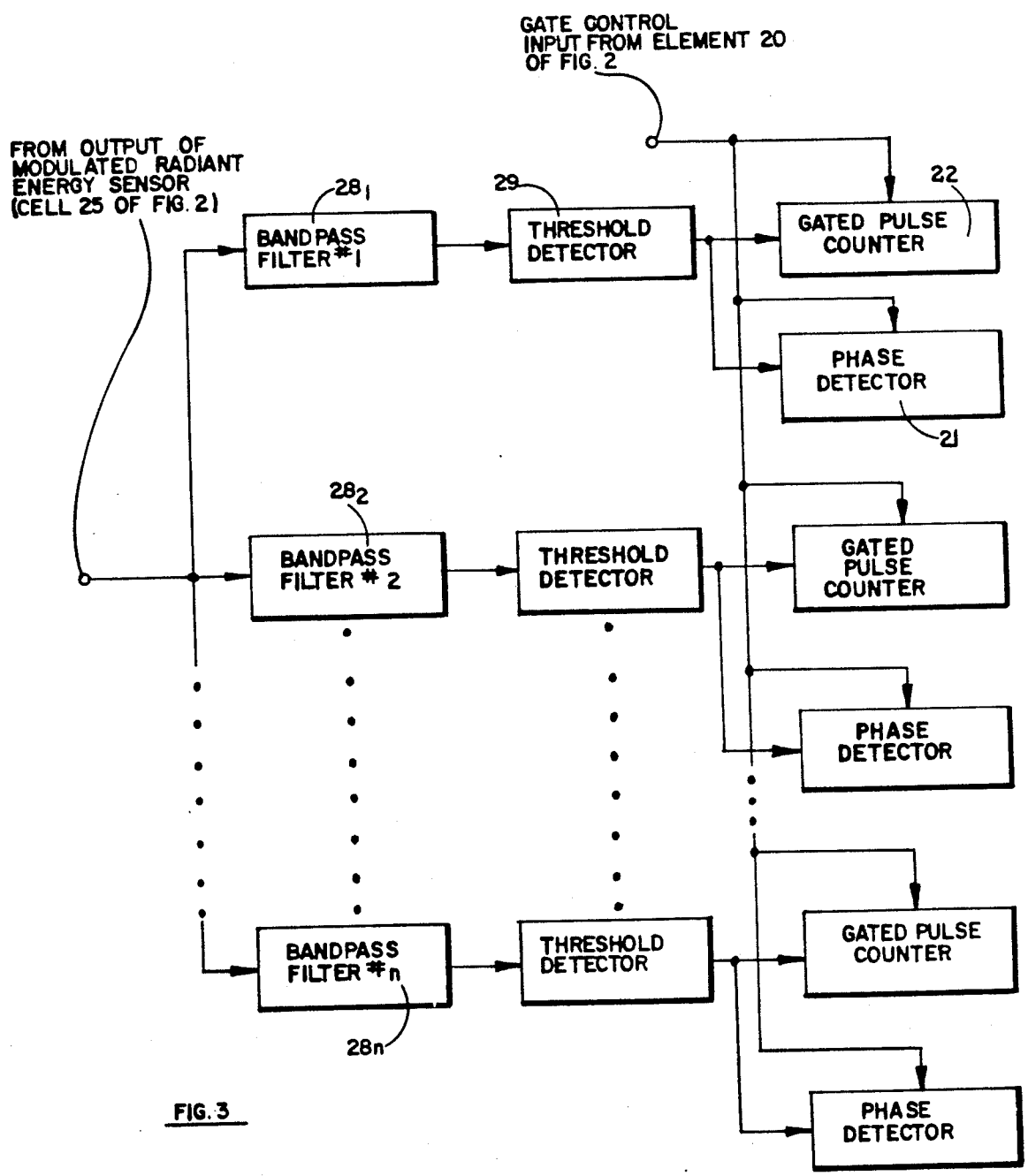
FIG. 3 is an alternate embodiment of the data processor of FIG. 2 and adapted for multiple target processing.

Referring to FIG. 3, there is illustrated a plurality of bandpass filters having limited bandpasses of progressively different center frequencies for distinguishing progressively different radial portions or radial sectors of reticle 10 (in FIG. 2), each filter having an input commonly connected to be responsive to a modulated radiant energy sensor signal. In normal operation, an output at a given one of filters 28 is indicative of a target at an angle corresponding to a pulse rate or frequency lying within the filter bandpass. A thresholded detector 29 may also be employed to further reduce the signal-to-noise ratio in the output response. A pulse counter, responsive to the bandpass limited and thresholded output of detector 29 each reticle cycle, determines the precise radial angle $\Psi$ of a target occurring within the filter bandpass. Thus, the determination of the angle is less sensitive to minor variations in the speed of drive means 20 (of FIG. 2). Further, the cooperation of filters 28 and counters 22 in the arrangement of FIG. 3 provides a multiple target tracking capability, in that targets producing outputs in mutually exclusive filters may be distinguished and the position angles thereof separately determined.

Although reticle 10 of FIG. 1 has been described in terms of an apertured element for cooperation with a separate radiant energy detector cell 25, as illustrated in FIG. 2, the concept of the invention is not so limited. In a preferred arrangement of the device of FIG. 1, disc 16 may be comprised of a radiant energy-transparent, electrically photoconductive material which is backed with a conductive reflective material, strips 15 being formed of a conductive material overlaid on a front face of disc 16 or that side thereof opposite the reflectively backed side thereof, a conductive arcuate strip 26 commonly connected in circuit with strips 15. The photoconductive material 16 is effective only between the conductive strips 15, as to thus constitute photoconductive strips 14. Thus, such reticle of alternate photoconductive strips, when exposed to and rotated within a focal plane of a limited field of view, serves the combined functions of both a modulating reticle and a sensor. Also, such arrangement permits a shorter axial length for the reticle and sensor assembly, in that only one set of optics is required. Further, the use of the reticle as the photoconductive electrode provides a large thin detector, having an electric field applied in the direction of minimum electrical resistance.

Accordingly, there has been described a novel reticle of unusual utility in determining the position of a radiant energy target image within a focal, or image, plane.

Although the invention has been described and illustrated in detail, it is to be clearly understood that the same is by way of illustration and example only and is not to be taken by way of limitation, the spirit and scope of this invention being limited only by the terms of the appended claims.

I claim:

1. In a radiant energy target detection system having a field of view,
    a fixed geometry wedge-shaped reticle having mutually parallel alternate masking and nonmasking strips, all said strips commonly parallel to a radial edge of said reticle, said reticle being mounted for rotation in the plane thereof and about the apex thereof to produce modulation of said field of view; and
    means responsive to said modulation to provide indications of a two-dimensional polar coordinate position of a sensed discrete radiant energy target within said field of view.

2. A radiant energy sensor system having a field of view and comprising
    a fixed geometry-shaped reticle interposed within the optical path of said field of view and having mutually parallel alternate masking and nonmasking strips, all said strips commonly parallel to a radial edge of said reticle, said reticle being rotatably mounted for rotation in the plane thereof and about the apex thereof at a preselected angular velocity to produce modulations of said field of view; and
    means responsive to the time-phase occurrence of said modulation for indicating an angular position of said target within said field of view; and
    means responsive to the number of modulations per reticle cycle for indicating the radial position of said target in said field of view, relative to said reticle apex.

3. A radiant energy sensor system having a field of view and comprising a fixed geometry-shaped reticle interposed within the optical path of said field of view and having mutually parallel alternate masking and nonmasking strips, all said strips commonly parallel to a radial edge of said reticle, said reticle being rotatably mounted for rotation in the plane thereof and about the apex thereof at a preselected angular velocity to produce modulations of said field of view, and means responsive to said modulations for indicating a two-dimensional polar coordinate position within said field of view of a detected discrete radiant energy source.

4. The device of claim 3 in which said means responsive to said modulations comprises a first plurality of means to provide indications indicative of the occurrence of a sensed target in each of successive ones of preselected radial sectors of a field of view and a second plurality of means, each in cooperation with a mutually exclusive one of said first plurality of means for indicating a target polar angle of position associated with an associated one of said preselected radial sectors.

5. The device of claim 3 in which said means responsive to said modulations is adapted to provide indications indicative of a plurality of discrete radiant energy targets and comprises a plurality of narrow band-pass filters of progressively different center frequencies and commonly coupled to said modulated output of said system;

a like plurality of pulse counters as filters; and a like plurality of phase detectors as filter, said phase detectors and counters being connected as sets, each set including a mutually exclusive one of said counters and of said detectors, a set of a counter and phase detector being coupled to an associated one of said filters by thresholded detector means.

6. In a radiant energy-sensing system, means for determining the position of a discrete target sensed within a field of view of said system and comprising a wedge-shaped reticle having mutually parallel, uniformly spaced, alternate masking and nonmasking strips, all said strips commonly parallel to a radial edge of said reticle, said reticle being rotatably mounted for rotation in the plane thereof and about the apex thereof for modulation of said field of view;

means responsive to the time-phase occurrence of said modulation for indicating an angular position of said target within said field of view; and means responsive to the number of modulations per reticle cycle for indicating the radial position of said target in said field of view relative to said apex.

7. The device of claim 7 in which said nonmasking strips comprise uniformly spaced photoconductive regions, said masking strips comprising electrically conductive strips commonly connected in electrical circuit.

8. The device of claim 7 in which said means responsive to said modulations is responsively connected in electric circuit with said reticle for indicating the position in said field of view of a discrete radiant energy target.